(12) United States Patent
Malcolmson et al.

(10) Patent No.: US 8,682,563 B2
(45) Date of Patent: Mar. 25, 2014

(54) SYSTEM AND METHOD FOR PREDICTING TURBINE RUB

(75) Inventors: Molli Anne Malcolmson, Atlanta, GA (US); Debasis Bal, Karnataka (IN); Rajagopolan Chandrasekharan, Karnataka (IN); Roopesh Ranjan, Karnataka (IN)

(73) Assignee: General Electric Company, Schenectady, NY (US)

( * ) Notice: Subject to any disclaimer, the term of this patent is extended or adjusted under 35 U.S.C. 154(b) by 300 days.

(21) Appl. No.: 13/221,036

(22) Filed: Aug. 30, 2011

(65) Prior Publication Data
US 2013/0054108 A1    Feb. 28, 2013

(51) Int. Cl.
*G06F 19/00* (2011.01)
(52) U.S. Cl.
USPC .......................................................... 701/100
(58) Field of Classification Search
CPC ............. G06F 19/00; G06G 7/70; F02C 7/00; F02C 9/00; F02C 7/12
USPC .......................... 701/100, 101, 111, 112, 113
See application file for complete search history.

(56) References Cited

U.S. PATENT DOCUMENTS

| | | | |
|---|---|---|---|
| 4,478,082 A | 10/1984 | Sato et al. | |
| 4,502,046 A | 2/1985 | Wonn et al. | |
| 4,563,675 A | 1/1986 | Miller et al. | |
| 6,460,013 B1 | 10/2002 | Nippes | |
| 6,487,491 B1 | 11/2002 | Karpman et al. | |
| 7,409,319 B2 | 8/2008 | Kant et al. | |
| 7,455,495 B2 | 11/2008 | Leogrande et al. | |
| 2009/0037121 A1 * | 2/2009 | Muralidharan et al. | ........ 702/35 |

* cited by examiner

*Primary Examiner* — Kim T Nguyen
(74) *Attorney, Agent, or Firm* — Cantor Colburn LLP

(57) ABSTRACT

A system for predicting turbine rub includes a monitoring system configured to form operational values for a turbine based on information received from the turbine and a correlation engine configured to form at least one correlated value from the operating values that correlates a first operating value to a second operating value. The system also includes a variable deriver configured to form at least one derived variable from a one of the operating values and a rub predictor that forms a rub prediction based on the at least one correlated value and the at least one derived value.

17 Claims, 2 Drawing Sheets

SYSTEM AND METHOD FOR PREDICTING TURBINE RUB

BACKGROUND OF THE INVENTION

The subject matter disclosed herein relates to turbines and, in particular, to predicting whether a portion of the turbine rotor will rub against the components mounted to the turbine housing or the turbine housing itself during a turbine start.

Turbomachines generally have a centrally disposed rotor that rotates within a stationary housing or shell. A working fluid (gas or steam) flows through one or more rows of circumferentially arranged rotor blades that extend radially from the periphery of the rotor shaft and one or more rows of circumferentially arranged stator blades that extend centripetally from the interior surface of the housing to the rotor shaft. The working fluid interacts with the blades and cause rotation of the rotor shaft to drive a load, such as an electric generator or a compressor. In order to ensure that as much energy as possible is extracted from the fluid, the tips of the stator blades are usually very close to the surface of the rotor. Similarly, the tips of the rotor blades are usually very close to the internal surface of the housing. Such a configuration prevents excessive amounts of working fluid from bypassing the row of rotor blades without imparting energy to them.

Differential thermal expansion during operating conditions between the housing and the rotor results in variations in the tip clearances. In extreme cases, the variations can lead to a phenomenon referred to as "rub" where the tips come into contact with another object. For example, the tips of the rotor blades can contact the housing. Also turbomachines are subjected to a variety of forces under various operating conditions, particularly during transient conditions, such as start-ups, shutdowns, and load changes. These forces may also cause rub. In some cases, rub can damage rotor and stator blades and seals of the turbomachine. The damage leads to costly repairs and machine downtime. Further, when rub is experienced during start up, standard procedures require that the turbomachine be shutdown and then restarted at a later time. This process can lead to further machine downtime.

BRIEF DESCRIPTION OF THE INVENTION

According to one aspect of the invention, a system for predicting turbine rub is disclosed. The system of this aspect includes a monitoring system configured to form operational values for a turbine based on information received from the turbine and a correlation engine configured to form at least one correlated value from the operating values that correlates a first operating value to a second operating value. The system of this aspect also includes a variable deriver configured to form at least one derived variable from a one of the operating values and a rub predictor that forms a rub prediction based on the at least one correlated value and the at least one derived value.

According to another aspect of the invention, a method for predicting turbine rub is disclosed. The method of this aspect includes: forming at a monitoring system operational values for a turbine based on information received from the turbine; forming at a correlation engine at least one correlated value from the operating values that correlates a first operating value to a second operating value; forming at a variable deriver at least one derived variable from a one of the operating values; and forming at a rub predictor a rub prediction based on the at least one correlated value and the at least one derived value.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
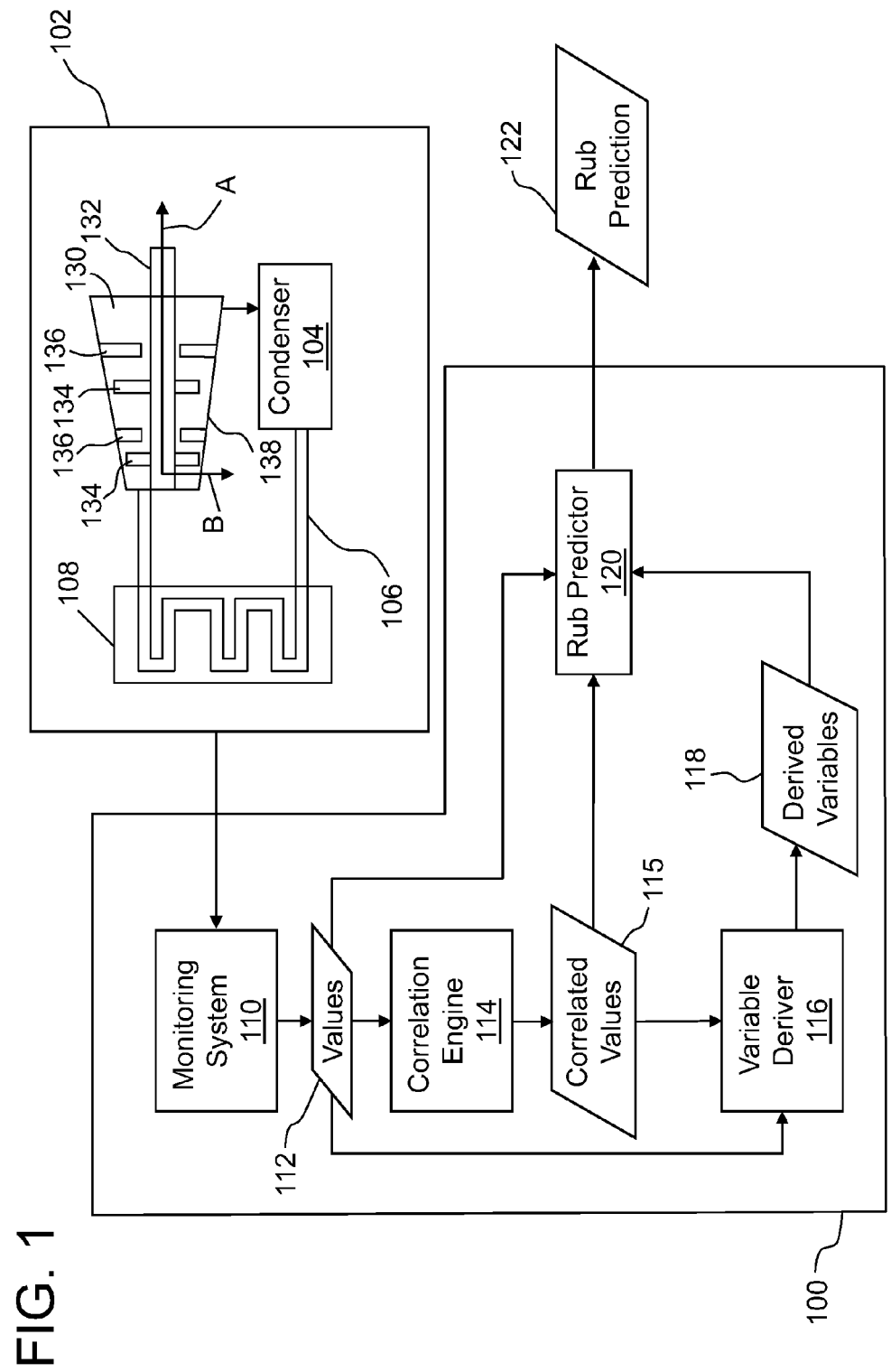
FIG. 1 is a dataflow diagram illustrating a system for and method of creating a rub prediction.

FIG. 1 illustrates a system 100 for predicting rub according to one embodiment coupled to an exemplary turbine system 102. In FIG. 1, the operation of the system 100 is illustrated such that it includes dataflow information as well as individual components. The system 100 can be used to create a prediction (rub prediction 122) of whether rub will occur during the next start up of the turbine system 102. In one embodiment, operational parameters of the turbine may be adjusted to avoid or reduce probability of rub based on a rub prediction 122.

The turbine system 102 can include any type of turbine. For example, the turbine system 102 could include a gas turbine, a steam turbine or other device that converts energy from a working fluid into mechanical energy.

In the event the turbine system 102 includes a steam turbine, the turbine system 102 generally includes a condenser 104 that stores water. Water from the condenser 104 is converted to steam by a boiler 108 and then provided to a steam turbine 130 via a water/steam conduit 106. The steam travels through the steam turbine 130 and is returned to the condenser 104. As the steam travels through the steam turbine 130 it expands and causes rotation of the turbine rotor 132 due to the interaction of the steam with the blades attached to the turbine rotor 132. The turbine rotor 132 can be used, for example, to drive a generator (not shown) to produce electricity.

It shall be understood that while the following discussion relates to steam turbine 130, the teachings herein can also be applied to a gas turbine without departing from aspects of the present invention. The steam turbine 130 includes rotor blades 134 (buckets) that extend radially outward from the turbine rotor 132. Stator blades 136 extend radially inward from an outer housing 138 of the steam turbine 130 towards the turbine rotor 132 and are generally disposed between longitudinally consecutive rotor blades 134. As one of ordinary skill will realize, the steam turbine 130 can include one or more of high, medium and low pressure sections and, as such, can include more than one water/steam conduit 106 connected thereto that delivers steam of different pressure to different sections of the steam turbine 130. Further, each of the sections can include a heating (or reheating) bowl where steam is heated to the required temperature/pressure for the corresponding section.

The turbine system 102, regardless of type, is coupled to and provides information to the system 100. In the illustrated embodiment, the information is provided to a turbine monitoring system 110. The information can include, but is not limited to, operational values of the turbine system 102. The operational values can be measured by sensors or can be based off of values measured by sensors. The operational values can also include non-measured information such as, for example, the number and type of starts experienced by the turbine system 102. In one embodiment, the operational values include, but are not limited to, the temperature of steam as it enters the steam turbine 138, a first stage (e.g., high pressure) upper bowl metal temperature, a first stage lower bowl metal temperature, metal temperature of one or more bearings coupled to any stage of the rotor 132, a lubrication oil cooler outlet temperature, a water reheat upper bowl inner metal temperature, vibration along the transverses axis of any of the bearings along the longitudinal axis of the turbine rotor 132 (the longitudinal axis is shown by arrow A and the transverse axis is shown by arrow B) and the positions of either the main stop or intercept valve. In FIG. 1, the operational values are illustrated by data referred to by reference numeral 112. It shall be understood that the monitoring system 110 may convert the information it receives from the turbine system 102 into a different format.

In one embodiment, the operational values 112 are provided to a correlation engine 114. The correlation engine 114 forms correlated values 115 from the operational values. The correlated values 115 can include one or more values that correlate one operational value (or a combination of multiple variables) to one or more other operational values. The correlated values 115 can include, for example, a correlation between a difference between the inlet steam temperatures and the first stage upper inner metal temperature and the metal temperature of one of the bearings (e.g., the first) along the longitudinal axis of the turbine rotor 132, the inlet steam temperature and the lubrication oil cooler outlet temperature, and the inlet steam temperature and the oil drain temperature of one of the bearings (e.g., the second). The correlated values 115 are formed as a Spearman or Kendall correlation, for example.

The operational values 112 can also be provided to a variable deriver 116 that forms derived values 118. The variable deriver 116 can be configured to form, in one embodiment, a historical analysis of one or more of the operational values 112. In one embodiment, the variable deriver 116 considers operational values 112 taken from before and after a ramp up point. For example, the variable deriver 116 can consider operational values 112 that range from 90 minutes before a turbine ramp up point (e.g., turbine hot-start) until 30 minutes after the ramp up. Limiting the operational values 112 in this manner can reduce computation time while still capturing values relevant to a turbine start up.

One or both of the variable deriver 116 and the correlation engine 114 can optionally be configured to filter certain values out of the operational values 112 before, respectively, forming the derived variables 118 and the correlated values 115. In one embodiment, values that were measured when the turbine was operating outside of a defined range of rotations per minute (RPM) are filtered out. The range can include a beginning limit (e.g., 7 RPM) and an end limit (e.g., 1000 RPM).

In one embodiment, the variable deriver 116 is configured to determine the change or rate of change of one or more of the operational values 112. In addition, the variable deriver 116 can be configured to determine the level of operational values 112 at the beginning of the RPM range (e.g. when the turbine was turning at 7 RPM) and the level of the operational value at the end of the RPM range (e.g., 100 RPM) as well as the difference in the value over that range. For example, the derived variables 118 can include the vibration in the direction of axis B of any of the bearings when the turbine reached the end of the range, the beginning stress measured in the rotor bore or at the outer surface of the high pressure section rotor, the metal temperature of any of the bearings at the end of the RPM range.

In one embodiment, one or both of the correlation engine 114 and the variable deriver 116 consider only operational values 112 related to the start immediately preceding the next planned start. In another embodiment, one or both of the correlation engine 114 and the variable deriver 116 consider operational values 112 related to several starts immediately preceding the next planned start.

The system 100 also includes a rub predictor 120 that, based on one or more of the operational values 112, the correlated values 114 and the derived variables 118, forms rub prediction 122 indicating a probability that a next start will experience rub. In one embodiment, the rub predictor 120 applies an algorithm that is formed based on examination of the operating conditions of turbines that experienced rub. In one embodiment, the algorithm utilizes at least one of the correlated values 115 and at least one of the derived variables 118 to form the rub prediction. It shall be understood that the rub prediction 122 can be a binary value (e.g., yes or no) or can be expressed in terms of a probability that rub will occur.

In one embodiment, the rub prediction 122 is based off of determining a rub probability (p) that can be expressed as shown in equation (1) below:

$$p = \frac{e^{(L)}}{1+e^{(L)}}. \tag{1}$$

In one embodiment, L is expressed as a function of at least one of the correlated values 115 and at least one of the derived variables 118 and can take, for example, the form as shown in equation (2) below:

$$L = A(CV) + B(DV) \tag{2}$$

where A and B are coefficients, CV is one of the correlated values 115 and DV is one of the derived variables 118. In one embodiment, the values of A and B can be formed based on analysis of prior occurrences of rub as can the selection of the CV and DV. In addition, one of ordinary skill will realize that L can be based on any number of different CV's and DV's.

A technical effect of one embodiment of the present invention is that, based on prior operations, a prediction of whether rub will occur on the next start of a turbine can be formed.

Figure 2:
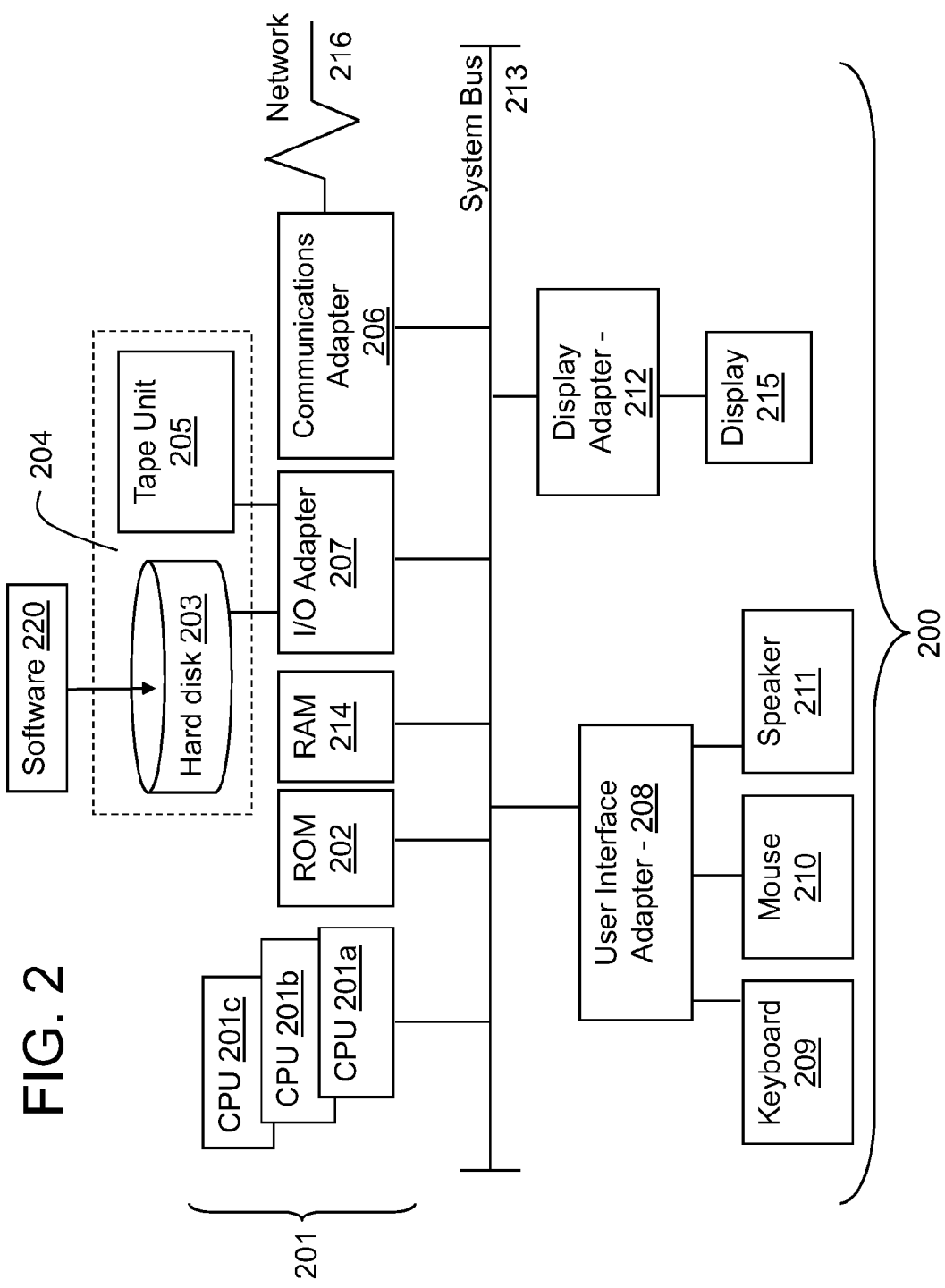
FIG. 2 illustrates a system on which embodiments of the present invention may be implemented.

Referring now to FIG. 2, there is shown an embodiment of a processing system 200 for implementing the teachings herein. The processing system 200 is an example of a server or other computing device on which the system for predicting rub 100 (FIG. 1) may be implemented.

In this embodiment, the processing system 200 has one or more central processing units (processors) 201a, 201b, 201c, etc. (collectively or generically referred to as processor(s) 201). In one embodiment, each processor 201 may include a reduced instruction set computer (RISC) microprocessor. Processors 201 are coupled to system memory 214 and various other components via a system bus 213. Read only memory (ROM) 202 is coupled to the system bus 213 and may include a basic input/output system (BIOS), which controls certain basic functions of system 200.

FIG. 2 further depicts an input/output (I/O) adapter 207 and a network adapter 206 coupled to the system bus 213. I/O adapter 207 may be a small computer system interface (SCSI)

adapter that communicates with a hard disk 203 and/or tape storage drive 205 or any other similar component. I/O adapter 207, hard disk 203, and tape storage device 205 are collectively referred to herein as mass storage 204. A network adapter 206 interconnects bus 213 with an outside network 216 enabling system 200 to communicate with other such systems. A screen (e.g., a display monitor) 215 can display the rub prediction 122 and can be connected to system bus 213 by display adaptor 212, which may include a graphics adapter to improve the performance of graphics intensive applications and a video controller. In one embodiment, adapters 207, 206, and 212 may be connected to one or more I/O busses that are connected to system bus 213 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to the system bus 213 via user interface adapter 208 and display adapter 212. A keyboard 209, mouse 210, and speaker 211 are all interconnected to bus 213 via user interface adapter 208, which may include, for example, an I/O chip integrating multiple device adapters into a single integrated circuit.

It will be appreciated that the processing system 200 can be any suitable computer or computing platform, and may include a terminal, wireless device, information appliance, device, workstation, mini-computer, mainframe computer, server, personal digital assistant (PDA), any other mobile or handheld computing device, or any other larger computing device. It should also be appreciated that the processing system 200 can implemented in a distributed computing architecture such as a cloud as well. It shall be understood that the processing system 200 may include multiple computing devices linked together by a communication network. For example, there may exist a client-server relationship between two systems and processing may be split between the two.

Any computer operating system may be utilized by the processing system 200. As illustrated, the processing system 200 also includes a network interface 206 for communicating over a network 216. The network 216 can be a local-area network (LAN), a metro-area network (MAN), or wide-area network (WAN), such as the Internet or World Wide Web.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for predicting turbine rub comprising:
a monitoring system configured to form operational values for a turbine based on information received from the turbine;
a correlation engine configured to form at least one correlated value from the operating values that correlates a first operating value to a second operating value;
a variable deriver configured to form at least one derived variable from one of the operating values; and
a rub predictor configured to calculate a probability of a rub as a function of a sum of the at least one correlated value and the at least one derived variable.

2. The system of claim 1, wherein the operational values include one or more of:
a temperature of steam as it enters the turbine;
a first stage upper bowl temperature;
a first stage lower bowl temperature;
temperature of a bearing coupled to any stage of a rotor of the turbine;
a lubrication oil cooler outlet temperature;
a water reheat upper bowl inner temperature;
a vibration measurement along a longitudinal axis of the rotor;
a position of a main stop valve; and
a position of an intercept valve.

3. The system of claim 2, wherein the correlated values include one or more of:
a correlation between a difference between an inlet steam temperature and a first stage upper inner metal temperature and a metal temperature of a bearing along the longitudinal axis of the turbine rotor;
a correlation between the inlet steam temperature and the lubrication oil cooler outlet temperature; and
a correlation between the inlet steam temperature and an oil drain temperature of one of the bearings.

4. The system of claim 3, wherein the correlated values are formed based on a Spearman or a Kendall correlation.

5. The system of claim 2, wherein the derived variables include a change or a rate of change of one or more of the operational values.

6. The system of claim 2, wherein the derived variables include at least one of a starting value or an ending value of one of the operational values.

7. The system of claim 6, wherein the starting value is formed when the rotor is rotating at a first rotations per minute (RPM) and the ending value is formed when the rotor is rotating at a second RPM greater than the first RPM.

8. The system of claim 1, wherein the rub predictor forms the rub prediction based on a relationship between a probability factor p and a value (L) such that $$p = \frac{e^{(L)}}{1 + e^{(L)}}$$

wherein L is the formed, at least in part, by the at least one correlated value and the at least one derived value.

9. The system of claim 1, wherein the at least one derived variable and the at least one correlated value is formed based on a start immediately preceding a start for which the rub prediction is being formed.

10. A method for predicting turbine rub comprising:
forming at a monitoring system operational values for a turbine based on information received from the turbine;
forming at a correlation engine at least one correlated value from the operating values that correlates a first operating value to a second operating value;
forming at a variable deriver at least one derived variable from one of the operating values; and
calculating at a rub predictor a probability of a rub as a function of a sum of the at least one correlated value and the at least one derived variable.

11. The method of claim 10, wherein the operational values include one or more of:
a temperature of steam as it enters the turbine;

a first stage upper bowl temperature;
a first stage lower bowl temperature;
temperature of a bearing coupled to any stage of a rotor of the turbine;
a lubrication oil cooler outlet temperature;
a water reheat upper bowl inner temperature;
a vibration measurement along a longitudinal axis of the rotor;
a position of a main stop valve; and
a position of an intercept valve.

12. The method of claim 11, wherein the correlated values include one or more of:
a correlation between a difference between an inlet steam temperatures and a first stage upper inner metal temperature and a metal temperature of a bearing along the longitudinal axis of the turbine rotor;
a correlation between the inlet steam temperature and the lubrication oil cooler outlet temperature; and
a correlation between the inlet steam temperature and an oil drain temperature of one of the bearings.

13. The method of claim 12, wherein the correlated values are formed based on a Spearman or a Kendall correlation.

14. The method of claim 11, wherein the derived variables include a change or a rate of change of one or more of the operational values.

15. The method of claim 11, wherein the derived variables include at least one of a starting value or an ending value of one of the operational values.

16. The method of claim 15, wherein the starting value is formed when the rotor is rotating at a first rotations per minute (RPM) and the ending value is formed when the rotor is rotating at a second RPM greater than the first RPM.

17. The method of claim 10, wherein the rub predictor forms the rub prediction based on a relationship between a probability factor p and a value (L) such that $$p = \frac{e^{(L)}}{1 + e^{(L)}}$$

wherein L is the formed, at least in part, by the at least one correlated value and the at least one derived value.

* * * * *